United States Patent Office 3,598,875
Patented Aug. 10, 1971

3,598,875
PRODUCTION OF DIHALOGEN ETHANES
Herbert Jenkner, Cologne-Deutz, Germany, assignor to Chemische Fabrik Kalk G.m.b.H., Cologne-Kalk, Germany
No Drawing. Filed Oct. 7, 1966, Ser. No. 584,962
Claims priority, application Germany, Oct. 12, 1965, C 37,131
Int. Cl. C07c 17/00
U.S. Cl. 260—658                          4 Claims

ABSTRACT OF THE DISCLOSURE

A process of producing 1-chloro-2-bromoethane by simultaneously introducing hydrogen bromide and vinyl chloride into 1-chloro-2-bromoethane in the presence of a peroxide, air or oxygen and initiating and carrying out the reaction at 0–80° C.

---

The present invention relates to an improved process for the production of dihalogen ethanes of the formula $CH_2X$—$CH_2Y$ wherein each of X and Y represents a different halogen atom selected from the group consisting of chlorine, bromine and iodine by the addition of a hydrogen halide HY to a vinyl halide of the formula $CHX=CH_2$.

While processes are known involving the reaction of HY with $CHX=CH_2$, the addition of the hydrogen halide to the olefinic double bond takes a very long time. For example, the production of 1-chloro-2-bromoethane from vinyl chloride and hydrogen bromide involves reaction times of at least several days to weeks. Such reaction times are required even when the reaction is carried out in inert solvents such as acetic acid, nitrobenzene, mesitylene and the like. Although the presence of peroxides and/or atmospheric oxygen in the reaction mixture does shorten the reaction time, the reaction still continues for days. The presence of air or peroxidic oxygen in the reaction mixture is of particular advantage in that it may encourage the production of 1,2 dihalogen ethanes at the expense of the formation of 1,1 dihalogen ethanes.

The cause for the long reaction times required, however, is not so much the inertia encountered in the addition of the hydrogen halide to the olefinic double bond as the length of the induction period before the reaction between the mixed components begins.

Under the conditions of the known processes for the production of 1,2 dihalogen ethanes from vinyl monohalides and the hydrogen halide of a different halogen, larger or smaller quantities of 1,1 dihalogen ethanes are produced as a by-product. This side reaction not only entails losses in the desired 1,2 dihalogen product but also produces compounds which contaminate the desired product and have to be removed therefrom in an additional purification operation.

It is an object of the invention to provide a process for the production of 1,2 dihalogen ethanes of the formula $CH_2X$—$CH_2Y$ which not only requires relatively short reaction times but also provides good yields.

According to the invention it was found that this object has been achieved by reacting a hydrogen halide of the formula HY with at least equimolecular quantities of a vinyl halide of the formula $CHX=CH_2$, each of X and Y representing a different halogen atom of an atomic weight of at least 35.5 such as chlorine, bromine and iodine, in the presence of peroxides or molecular oxygen if the reaction is initiated and carried out in the presence of a sufficient amount of a dihalogen ethane of the formula $CH_2X$—$CH_2Y$ as solvent wherein X and Y have the same significance as above. Preferably the dihalogen ethane employed as solvent is the same as that produced by the process. The process according to the invention, for example, can be employed for the production of 1-chloro-2-bromoethane or 1-chloro-2-iodoethane by reaction of vinyl chloride with hydrogen bromide or iodide.

In carrying out the process according to the invention the hydrogen halide is introduced simultaneously with at least an equimolar quantity of the vinyl halide into a reaction mixture containing, for example, 0.25 to 0.45 mol of dihalogen ethane as solvent per mol of vinyl halide introduced. The hydrogen halide and vinyl halide while introduced simultaneously are introduced into the reaction mixture at separated locations. The quantity of dihalogen ethane provided as solvent depends upon the quantities of the vinyl halide and hydrogen halide to be reacted, the size of the reaction vessel and the rate at which the reactants are introduced. When smaller quantities are to be reacted and the rate of introduction is lower, the quantity of dihalogen ethane required becomes smaller. For example, when 10 mol of each of vinyl chloride and hydrogen bromide are introduced and reacted in a reaction vessel over a five hour period the quantity of dihalogen ethane such as 1-chloro-2-bromoethane required as solvent is about 500 g. (3.5 mol) whereas when the same quantities of reactants are to be introduced and reacted over a ten hour period the quantity of dihalogen ethane required is only about 300 g. The optimum quantity of dihalogen ethane required for initiating and carrying out the reaction can easily be ascertained through simple preliminary tests. As already indicated the vinyl halide and hydrogen halide are introduced simultaneously in such a manner that at least one mol of vinyl halide is always present in the reaction mixture per mol of hydrogen halide. Preferably the quantities should be equimolar or such that a 0.1 to 1% excess of vinyl halide is provided. Such excess is preferred when the process is carried out continuously. Thus, for example, in carrying out the process continuously 100 to 101 mol per hour of vinyl halide are introduced into the dihalogen ethane employed per 100 mol per hour of hydrogen halide while continuously withdrawing 100 mol per hour of dihalogen ethane. The quantity of dihalogen ethane maintained as solvent in the reaction vessel is about 5 to 100 kg. per 100 mol of hydrogen halide introduced per hour.

The hydrogen halide, employed as reactant, is introduced as a water free gas. When air or oxygen are introduced into the reaction mixture to accelerate the reaction, they may be premixed with the hydrogen halide. It may be of advantage to use pure oxygen instead of air. Peroxides such as ascaridole or benzoyl peroxide have the same effect on the course of the reaction as molecular oxygen and can be added to the reaction mixture instead of the molecular oxygen.

A temperature of from 0 to 80° C., preferably, from 10 to 30° C., should be maintained in the reaction mixture. The products formed in the rapid and exothermic reaction are withdrawn from the reaction vessel and neutralized by admixing an aqueous solution of a neutralizing agent such as an alkali metal carbonate or hydroxide therewith. The neutralized mixture upon standing separates into an aqueous layer and a layer of the dihalogen ethane. After separation of the latter from the aqueous layer, it is dried and distilled.

The process according to the invention can be carried out continuously or non-continuously. It provides a method which is easy to carry out on an industrial scale whereby dihalogen ethanes of the formula $CH_2X$—$CH_2Y$ can be produced in yields of 96 to 100%. The dihalogen ethanes produced contain no isomeric 1,1 dihalogen ethanes and no substitution products. It is surprising that with the process according to the invention complete reaction of the vinyl halide and the hydrogen halide only takes from a few minutes to several hours, depending on the quantities to be reacted, whereas with the previously known process carried out without a solvent or with foreign solvents such as acetic acid, nitrobenzene and mesitylene, substantially quantitative reactions can only be attained in periods of several days to weeks. Any large scale industrial use of the previously known processes is therefore practically precluded.

The following examples will serve to illustrate the process according to the invention.

EXAMPLE 1

500 g. (3.5 mol) of 1-chloro-2-bromoethane were placed into a cylindrical glass reaction vessel fitted with 2 spaced gas injection tubes. 810 g. (10 mol) of anhydrous hydrogen bromide containing 1 wt. percent of air were introduced into the reaction vessel onto the bottom thereof through one of the injection tubes while simultaneously 625 g. (10 mol) of vinyl chloride were introduced through the other tube over a period of 5 hours.

The reaction mixture was cooled to maintain it at a temperature of 20° C. The reaction was completed substantially as the introduction of the vinyl chloride and hydrogen bromide was completed and the water clear reaction mixture was then distilled. 1420 g. (99% of theory) of new, pure 1-chloro-2-bromoethane were obtained.

EXAMPLE 2

50 kg. of 1-chloro-2-bromoethane were maintained in a cylindrical enamelled reaction vessel of 100 liters capacity provided with two spaced gas injection tubes and a siphon. The contents of the reaction vessel were maintained at 20° C. by cooling. 8.1 kg. per hour of anhydrous hydrogen bromide containing 1 wt. percent of air were introduced continuously into the reaction vessel onto the bottom thereof through one of the injection tubes whereas simultaneously 6.3 kg. per hour of vinyl chloride were introduced through the other tube. 14.2 kg. of 1-chloro-2-bromoethane were continuously withdrawn over the siphon.

I claim:
1. In a process of producing 1-chloro-2-bromoethane by reacting vinyl chloride with hydrogen bromide in the presence of ascaridole, benzoyl peroxide, air or oxygen, the improvement comprising initiating the reaction by simultaneously introducing the hydrogen bromide and vinyl chloride into 1-chloro-2-bromoethane as a solvent so that an excess of up to 1% of the vinyl chloride is provided in the reaction mixture, the reaction being initiated and carried out at 0–80° C.

2. The process of claim 1 wherein air or oxygen is used and is premixed with the hydrogen bromide.

3. The process of claim 1 wherein the vinyl chloride is introduced at a rate of 100–101 mol per hour, the hydrogen bromide at a rate of 100 mol per hour, the 1-chloro-2-bromoethane is maintained at a rate of 5–100 kg. per hour and the 1-chloro-2-bromoethane produced is withdrawn at a rate of 100 mol per hour.

4. The process of claim 1 in which air or oxygen is used and the reaction mixture is maintained at 10 to 30° C.

References Cited

UNITED STATES PATENTS

| | | | |
|---|---|---|---|
| 2,007,144 | 7/1935 | Nutting et al. | 260—658 |
| 2,058,466 | 10/1936 | Kharasch | 260—658UX |
| 2,299,411 | 10/1942 | Rust et al. | 260—658X |

FOREIGN PATENTS

| | | | |
|---|---|---|---|
| 702,594 | 1/1965 | Canada | 260—658 |

OTHER REFERENCES

Kharasch et al.: Jour. Amer. Chem. Soc., 55, pp. 2521–2523, 2527, 1933.

Kharasch et al.: Jour. Amer. Chem. Soc., 56, pp. 712–714.

LEON ZITVER, Primary Examiner

H. T. MARS, Assistant Examiner